United States Patent [19]

Fenton

[11] 3,714,270

[45] Jan. 30, 1973

[54] HYDRATION OF AMINES TO ALCOHOLS

[75] Inventor: Donald M. Fenton, Anaheim, Calif.

[73] Assignee: Union Oil Company of California, Los Angeles, Calif.

[22] Filed: June 24, 1970

[21] Appl. No.: 49,504

[52] U.S. Cl.........260/632 R, 260/618 R, 260/617 R, 260/631 R, 260/599, 260/601 R
[51] Int. Cl..............................................C07c 29/00
[58] Field of Search....................260/632 R, 618 R 260/617 R, 631 R

[56] References Cited

FOREIGN PATENTS OR APPLICATIONS 494,666  10/1938  Great Britain.....................260/632 R

OTHER PUBLICATIONS

Somerville, Chem. Abs., Vol. 25 (1931) 5611.

*Primary Examiner*—Bernard Helfin
*Attorney*—Martin W. Lee, Richard C. Hartman, Lannas S. Henderson, Dean Sandford, Robert E. Strauss and Stuart W. Knight

[57] ABSTRACT

A primary, secondary or tertiary amine is hydrated in a liquid reaction medium containing a ruthenium, osmium, rhenium, or technetium catalyst, preferably in complex association with a biphyllic ligand at a temperature of 50°–400°C, to form an alcohol. A typical process comprises reacting tributylamine with water in a liquid medium containing ruthenium trichloride and triphenylphosphine to produce butanol.

14 Claims, No Drawings

HYDRATION OF AMINES TO ALCOHOLS

DESCRIPTION OF THE INVENTION

The invention relates to a method of forming an alcohol. More particularly, the invention relates to forming an alcohol by hydrating a primary, secondary or tertiary amine.

Various methods whereby alcohols are produced are known in the art. It is not known, however, that an alcohol can be formed from a primary, secondary or tertiary amine by simple hydration. Hence, the reaction of the invention comprises a novel process. In addition, a highly active catalyst is provided for the hydration.

According to the invention, a primary, secondary or tertiary amine is reacted with water in a liquid medium containing a minor amount of ruthenium, osmium, rhenium, or technetium, preferably in complex association with a biphyllic ligand, to be defined hereinafter, to form an alcohol. The reaction proceeds according to the following exemplary equations:

$$R_3N + H_2O \rightarrow R_2NH + ROH$$

$$R_2NH + H_2O \rightarrow RNH_2 + ROH$$

$$RNH_2 + H_2O \rightarrow NH_3 + ROH$$

It should be noted that when a tertiary amine is hydrated, 3 moles of alcohol are formed from 1 mole of tertiary amine and when a secondary amine is hydrated, 2 moles of alcohol formed from 1 mole of the amine. Accordingly, the invention has the advantage that an alcohol may be produced very inexpensively from an amine.

The amine reactant of the invention may be a primary, secondary or tertiary amine having the following general structure:

$$R_3N$$

wherein R is hydrogen or the same or different alkyl, cycloalkyl, alkylcycloalkyl, cycloalkylalkyl, or aralkyl having one to 20, preferably one to 12 carbons. Preferably R is hydrogen or alkyl.

Examples of suitable groups are methyl, ethyl, propyl, 2-ethylhexyl, octyl, nonyl, decyl, octadecyl, cyclobutyl, methylcyclopentyl, cyclohexyl, cyclooctyl, diethylcyclohexyl, phenyl, tolyl, benzyl, 3-phenylhexyl, 3-butyl-4-benzyldecyl, 4-tolyl-5-cyclohexyldodecyl, 2,3-dipropylcyclononyl, etc.

Examples of suitable amines are methylamine, ethylamine, propylamine, butylamine, pentylamine, hexylamine, heptylamine, octylamine, undecylamine, hexadecylamine, octadecylamine, diethylamine, dipropylamine, dibutylamine, dioctylamine, dinonylamine, diundecylamine, dinonadecylamine, methyloctylamine, 2-butyl-3-pentyloctylamine, triethylamine, tributylamine, tripentylamine, trioctylamine, tridecylamine, tritetradecylamine, cyclodecylamine, dicyclobutylamine, methylcyclononylamine, propyldicyclononylamine, tricyclohexylamine, tricyclodecylamine, cyclohexyldibutylamine, phenylamine, tolylamine, benzylamine, 4-tolylethylamine, 2-phenylhexylamine, di-2-phenylhexylamine, phenyldipropylamine, tri-3-phenyl-4-butylpentylamine, hexylcyclooctylamine, di-3-phenyl-4-butyloctylamine, etc. The tertiary alkyl amines having identical alkyl groups are most preferred.

The catalyst of the invention may be ruthenium, osmium, rhenium or technetium, preferably ruthenium. A minor amount of the catalyst is used, e.g., 0.001–5 weight percent, preferably 0.001–5 weight percent, preferably 0.001–2 percent calculated as the metal and based on the reaction medium. The metal may be added as a soluble salt, complex, acid, or oxide, preferably a salt such as a halide (chloride, bromide, iodide, or fluoride), hydroxide, cyanide, nitrate, sulfate, carbonate, $C_1$–$C_5$ carboxylate, etc. The metal may also be added as a free metal providing the reaction medium includes a complexing agent or anion, such as the aforementioned anions, ammonia, $C_2$–$C_{15}$ alkylene diamine, e.g., ethylene diamine, propylene diamine, butylene diamine, nonylene diamine, etc., or $C_1$–$C_5$ primary or secondary alkyl amine, carbon monoxide, a halogen, hydrogen, or a biphyllic ligand as will be described hereinafter. Preferably, the catalyst is added as a halide; preferably chloride. Suitable sources of the metal catalyst include ruthenium tetrachloride, ruthenium trichloride, ruthenium cyanide, ruthenium pentacarbonyl, ruthenium carbonyl hydride, ruthenium nitrate, ruthenium hydroxide, ruthenium sulfide, tetraaminorutheniumhydroxychloro chloride, ruthenium acetate, ruthenium benzoate, osmium dichloride, osmium iodide, osmium oxide, osmium nitrate, osmium sulfite, chloroosmic acid, osmium valerate, osmium sulfate, tetraaminooxmiumhydroxy chloride, ruthenium bromide, rhenium pentacarbonyl, rhenium chloride, rhenium dioxide, rhenium heptoxide, rhenium sulfide, trimethylrhenium, dipyridyl perrhenate, technetium chloride, technetium nitrate, technetium oxide, etc. The particular method by which the metal is added to the reaction medium is not the essence of the invention nor particularly critical to the reaction.

The process is preferably conducted in the presence of a biphyllic ligand which forms a complex with and stabilizes the aforementioned catalyst. Use of a biphyllic ligand is, however, not essential to the process. The biphyllic ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands are well known in the art and can comprise organic compounds having at least about three carbons and containing arsenic, antimony, phosphorus or bismuth in a trivalent state. Of these the phosphorus compounds, i.e., the phosphines, are preferred; however, the arsines, stibines and bismuthines can also be employed. In general these biphyllic ligands have the following structure:

$$E(R')_3$$

wherein E is trivalent phosphorus, arsenic antimony or bismuth; and wherein R' is the same or different alkyl having one to about 10 carbons, cycloalkyl having four to about 10 carbons and/or aryl having six to about 10 carbons, examples of which are methyl, butyl, nonyl, cyclohexyl, cyclodecyl, phenyl, tolyl, xylyl, duryl, etc. Preferably at least one R' is aryl, e.g., phenyl, tolyl, xylyl, etc., and, most preferably, the ligand is triaryl.

Examples of suitable biphyllic ligands having the aforementioned structure and useful in my invention to stabilize the catalyst composition are the following: trimethylphosphine, triethylarsine, triethylbismuthine, triisopropylstibine, dioctylcycloheptylphosphine, tricyclohexylphosphine, ethyldiisopropylstibine, tricyclohexylphosphine, methyldiphenylphosphine, methyldiphenylstibine, triphenylphosphine, triphenylbismuthine, tri(o-tolyl)-phosphine, ethyldiphenylphosphine, phenylditolylphosphine, phenyldiisopropylphosphine, phenyldiamylphosphine, xylyldiphenylarsine, tolyldi(m-xylyl)stibine, trixylylphosphine, trixylylarsine, trixylylstibine, cyclopentyldixylylstibine, dioctylphenylphosphine, tridurylphospine, tricumenylphosphine, trixylylbismuthine, etc. Of the aforementioned, the mono-, di- and tri- aryl phosphines, particularly the triarylphosphines (e.g., triphenylphosphine), are preferred because of their greater activity.

The catalyst can be complexed with the above-described biphyllic ligand before being introduced into the reaction medium or the complex may be formed "in situ" by simply adding the metal and the biphyllic ligand directly into the reaction medium. In either case, it is generally preferable that the quantity of biphyllic ligand be in excess, e.g., 10–300 percent of that stoichiometrically required to form a complex with the metal and is generally 0.01–10 weight percent of the reaction medium. The complex has from 1 to about 5 moles of biphyllic ligand per atom of the metal and other components such as hydride, or soluble anions such as sulfate, nitrate, $C_1$-$C_5$ carboxylates (e.g., acetate, propionate, isobutyrate, valerate, etc.), halide, etc. may be but need not be included in the complex catalyst of this invention. These components may be incorporated in the catalyst by the formation of the catalyst complex from a metal salt of the indicated anions. A preferred complex is one comprising at least one halide ligand, e.g., acetate, propionate, butyrate, benzoate, etc., since these groups, particularly the halides, improve the activity of the catalyst.

The process is preferably conducted in the presence of 0.01–10 weight percent, preferably 0.01–5 percent of a base, preferably a strong base such as the alkali or alkaline earth metal hydroxides, e.g., sodium hydroxide, potassium hydroxide, lithium hydroxide, calcium hydroxide, magnesium hydroxide, etc. Since the reactant amine is alkaline, the addition of further alkaline agents is not essential to operability but is only preferred for maximum activity.

The reaction is performed under liquid phase conditions. When the reactants and/or product are liquids under the reaction conditions, they can form the desired liquid phase and be diluted, if desired, with a suitable inert organic liquid, preferably a liquid which is a solvent for the reactants and catalyst. Suitable liquids include the saturated and aromatic hydrocarbons which are exemplified by hexane, heptane, octane, benzene, toluene, cyclohexane, cyclodecane, etc. The liquid phase can also be formed simply by use of an excess of the reactant amine, if a liquid, e.g., 2–100 times that stoichiometrically required for the reaction.

The process may be conducted at mild conditions such as temperatures of 50°–400°C., preferably 80°–250 °C. and pressures of 1–70 atmospheres absolute, preferably 1–30 atmospheres and sufficient to maintain liquid phase conditions. The desired pressure may be maintained by adding an inert gas, e.g., nitrogen, to the reaction mixture, however, addition of an inert gas is generally not required.

The reaction can be performed batchwise or in a continuous fashion. When operating batchwise, the catalyst, reaction medium, the amine, and the strong base, if utilized, can be introduced in the reaction zone to form a liquid phase therein. The reaction zone can be heated to the desired reaction temperature by preheating the liquid so introduced or by use of heating means in the reactor. In the case where an inert gas is utilized, the inert gas can be introduced to maintain the desired reaction pressure. When performing the reaction in a continuous fashion, the liquid components can be continuously charged to the reaction zone to maintain a liquid phase therein and the amine reactant can be continuously introduced into the reaction zone to contact the reaction medium containing the catalyst.

The product alcohol undergoes, upon further and extensive contact with the catalyst, dehydrogenation to produce an aldehyde. If it is desired that the dehydrogenation of the alcohol product to an aldehyde be minimized, the process is advantageously conducted in the presence of hydrogen, e.g., 1–300 atmospheres, preferably 10–300 atmospheres of hydrogen. The reaction may be conducted in minimum contact times with or without hydrogen addition consistent with obtaining an adequate yield per pass of the alcohol. To encourage dehydrogenation of the alcohol to the corresponding aldehyde it is, of course, advantageous to conduct the process at low pressures, e.g., 1–15, preferably 1–5 atmospheres, sufficient to maintain liquid phase but to encourage release of hydrogen, and to utilize long contact times, all of which are known in the art and/or can be ascertained with minimum experimentation.

EXAMPLE 1

The following example illustrates the invention and demonstrates the results actually obtained.

To a steel bomb were added 50 milliliters tributylamine, ½ gram ruthenium trichloride, 5 grams triphenylphosphine and 10 milliliters of water. The bomb was pressured with nitrogen to about 7 atmospheres. The mixture was rocked and heated to and maintained at 125°C. for 2 hours and at 200°C. for another 2 hours. The bomb was cooled, the liquid contents were removed and analyzed to reveal that 2 grams of butanol along with 2.5 grams of dibutylamine and ½ gram of butylamine were formed in the process.

EXAMPLE 2

The following examples illustrate other modes of practice presently contemplated:

To an autoclave may be charged 200 milliliters of tricycloheptylamine, 400 milliliters of water, 5 grams osmium nitrate and 20 grams triphenylarsine. The autoclave is pressured with nitrogen to 10 atmospheres and heated to and maintained at 300°C. for 10 hours. The liquid contents are removed and cycloheptanol is recovered by distillation.

To an autoclave is added 200 milliliters of ethyl-di-2-phenyloctylamine, 300 grams of water, 5 grams rhenium bromide and 10 grams tritolylphosphine. The autoclave is pressured with hydrogen to 5 atmospheres and heated to and maintained at 250°C. for 6 hours.

The liquid contents are removed and ethanol and 2-phenyloctanol is recovered by distillation.

To an autoclave may be added 100 milliliters of 3-phenyl-4-butyldecylamine, 200 milliliters of water, and 5 grams ruthenium trichloride. The autoclave is heated to and maintained at 200°C. for 5 hours. The liquid contents are removed and 3-phenyl-4-butyldecanal is recovered by distillation.

I claim:

1. A process for the production of alcohols comprising reacting a primary, secondary or tertiary amine having the structure:

$$R_3N$$

wherein R is hydrogen or the same or different alkyl, cycloalkyl, alkylcycloalkyl, cycloalkylalkyl, or aralkyl having one to 20 carbons with water in a liquid reaction medium containing 0.001–5 weight percent of a ruthenium complex with a biphyllic ligand having the structure:

$$E(R^1)_3$$

wherein E is trivalent phosphorus, arsenic or antimony and wherein $R^1$ is the same or different alkyl having one to about 10 carbons, cycloalkyl having four to about 10 carbons or aryl having six to about 10 carbons at reaction conditions of a temperature of 50–400°C. and a pressure of 1–70 atmospheres absolute sufficient to maintain liquid reaction conditions and hydrate said amine to said alcohol.

2. The process of claim 1 wherein said biphyllic ligand is an aryl phosphine.

3. The process of claim 1 wherein said amine is a tertiary alkyl amine.

4. The process of claim 3 wherein the ruthenium is added to the reaction medium as a halide.

5. The process of claim 1 wherein the process is conducted in the presence of 1–300 atmospheres of hydrogen.

6. The process of claim 2 wherein said aryl phosphine is triphenylphosphine.

7. The process of claim 1 wherein said reaction medium also contains from 0.01 to 5 weight percent of an alkali metal or alkaline earth metal hydroxide.

8. The process of claim 1 wherein from 1 to about 5 moles of said biphyllic ligand per atom of ruthenium are in said complex and there is present from 10 to 300 percent of said biphyllic ligand in excess of the amount in said complex.

9. The process of claim 1 wherein said biphyllic ligand is present at a concentration from 0.01 to 10 weight percent of said reaction medium.

10. The process of claim 1 wherein said temperature is 80° to 250°C.

11. The process for the hydration of tributylamine to produce butanol by contacting tributylamine with water in a liquid reaction medium containing 0.001 to 5 weight percent of a complex of ruthenium with from 1 to about 5 moles of triphenylphosphine at reaction conditions of a temperature of 50° to 400°C. and a pressure of 1 to 70 atmospheres absolute, sufficient to maintain liquid reaction conditions and to hydrate said amine to said alcohol.

12. A process for the production of alcohols comprising contacting a primary secondary or tertiary amine having the formula:

$$R_3N$$

wherein R is the same or different constituent selected from hydrogen and a $C_1$–$C_{12}$ alkyl;
with water in a liquid reaction medium containing from 0.001 to 5 weight percent of a ruthenium salt soluble in said reaction medium and in complex association with a biphyllic ligand having the formula:

$$E(R')_3$$

wherein E is phosphorus and
R' is the same or different constituent selected from a $C_1$–$C_{10}$ alkyl,
a $C_4$–$C_{10}$ cycloalkyl and a $C_6$–$C_{10}$ aryl;
said contacting being conducted at a temperature of 50° to 400°C. and a pressure of 1 to 70 atmospheres absolute, sufficient to maintain liquid phase conditions and to hydrate said amine to the corresponding alcohol.

13. The process defined in claim 12 wherein said biphyllic ligand is triphenyl phosphine.

14. The process defined in claim 13 wherein said amine is a tertiary amine and said ruthenium salt is a ruthenium halide.

* * * * *